United States Patent Office 3,163,744
Patented Dec. 29, 1964

3,163,744
NON-CONSUMABLE ARC-MELTING AND
ARC-WELDING ELECTRODES
Simon S. Aconsky, Westport, and James R. Doyle, Middletown, Conn., assignors to United Aircraft Corporation, East Hartford, Conn., a corporation of Delaware
No Drawing. Filed Feb. 23, 1962, Ser. No. 175,306
11 Claims. (Cl. 219—145)

This invention relates to novel non-consumable arc-melting and arc-welding electrodes, and more particularly to such electrodes for use in the melting, purification, and welding of high melting point reactive and refractory metals and their alloys.

It will be understood that as used in this application, the term "reactive metals" refers to titanium and zirconium, and the term "refractory metals" refers to the metals with melting points equal to or higher than that of chromium, 1875° C. The refractory metals of this application are thus: chromium, vanadium, rhodium, halfnium, ruthenium, columbium, iridium, molybdenum, tantalum, osmium, rhenium, and tungsten.

In the past, the field of non-consumable arc-melting electrodes for use in the melting, purification, and welding of high melting point reactive and refractory metals has practically been preempted by the thoriated-tungsten electrode, usually consisting essentially of tungsten and thorium oxide. The thorium in the electrode provides an effective thermionic emitter to maintain the high intensity arc of high melting point metals.

With such electrodes, it has been necessary to provide an inert gas atmosphere, such as argon, to stabilize the tungsten non-consumable electrode arc. Below about 30 mm. Hg the arc becomes positionally unstable and no longer anchors on the molten pool. If the pressure is reduced still further, the arc becomes diffuse and spreads over a large area of both the anode and cathode so that it no longer supplies substantial heat to the molten pool. At still lower pressures (below 1000 microns) the arc leaves the molten pool entirely and goes upward along the electrode forming a cascade of long thin arcs. If this condition occurs for any length of time, serious damage to the furnace and burning of insulation is quite likely to occur.

Since it is necessary to maintain an inert gas atmosphere in the furnace when a thoriated-tungsten electrode is used to support the arc, it has not been possible in the past to melt refractory metals under low pressure or in a vacuum to promote purification by degassing. To remedy this dilemma, both the use of reducing agent having large negative free energies of formation with non-metallic impurity elements and the two-step process of first melting a metal powder containing a de-oxidizer with a non-consumable electrode followed by a second melting in a vacuum have been recommended in the past. It became clear, however, that the ideal solution would be provided if a safe non-consumable electrode could be found that could combine the desired functions of arc melting in a vacuum at low melt rates and powerful chemical reducing and gettering for removal or impurities from the melt.

Other disadvantages of the use of the thoriated-tungsten electrode for the melting of reactive and refractory metals and their alloys (other than tungsten) are that tungsten may be washed into the molten pool through erosion of the electrode tip or through splashing of lower melting metals from the molten pool on to the electrode to form a low melting tungsten alloy which then drips back into the melt.

When thoriated-tungsten electrodes are used for welding, a more serious source of contamination than those just enumerated can result if the electrode tip touches the molten weld causing the electrode to "stick." More often than not, in trying to free the electrode, the tip breaks off and remains in the weld. When this happens, every effort is made to remove the tungsten by grinding away that portion of the weld. The seriousness of the tungsten inclusion problem in welds has become apparent through cracking of refractory metal alloy ingots during fabrication. Radiography of the cracked rods indicated the presence of inclusions, and these inclusions have been identified by emission spectrography as tungsten. In these investigations, it was obvious that the tungsten inclusions were caused by "sticking" of the tungsten welding electrode during earlier preparation of the ingot.

At present, few successful techniques for casting shaped parts of reactive and refractory metals and their alloys are available. This is mainly due to the fact that their high reactivity with mold materials results in contamination of the metal. Accordingly, most pieces of hardware produced from these metals are machined with the result that large quantities of scrap turnings are generated. More often than not, this scrap while essentially of high purity becomes oxidized as a result of machining. There has thus been a severe need for an economical method by which this scrap could be simultaneously remelted and de-oxidized.

It is, accordingly, a primary object of this invention to provide a non-consumable arc melting electrode that permits the simultaneous melting and purification of the reactive and refractory metals and their alloys by achieving both the ability to arc melt in a dynamic vacuum at low melt rates and the function of continuously yielding a powerful volatile reducing and chemical gettering agent that will combine with impurities and allow the combined impurities and gettering agent to be withdrawn from the vicinity of the melt by the dynamic vacuum.

Another object of this invention is to provide a new and improved non-consumable arc melting electrode that achieves the advantages of previous non-consumable electrodes without their disadvantages, that permits less strict requirements as to selection and preparation of raw materials, and that provides a volatile "getter" over the melt in non-consumable arc melting while in the molten state under a dynamic vacuum to permit removal of impurities that leave the melt to combine with the volatile getter. The chemical combinations formed by the volatile getter with the impurities are then removed from the vicinity of the melt through operation of the dynamic vacuum.

Additional objects of this invention are to provide a new and improved non-consumable arc melting electrode that sustains an arc in a vacuum; that achieves high arc temperatures but maintains relatively low electrode temperatures; that permits welding under a dynamic vacuum; that achieves simultaneous melting and purification of reactive and refractory metals and their alloys by which metal powders may be economically consolidated into high purity ingots; that provides a low cost method for remelting and repurifying machinings and scrap of the reactive and refractory metals; and that has a tip with areas of low thermionic work function that permits a high intensity arc melting current to pass readily from the electrode to the melt.

It is still further object of this invention to provide a new and improved non-consumable arc-melting electrode for the reactive and refractory metals and their alloys in which the base metal of both the electrode and melt can be matched to eliminate metallic contamination in melting or welding.

Additional objects and advantages of the invention will be set forth in part in the description that follows, and in part will be obvious from the description, or may be learned by practice of the invention, the objects and advantages being realized and attained by means of the compositions and combinations particularly pointed out in the appended claims.

To achieve the foregoing objects, and in accordance with its purpose, this invention provides new and improved non-consumable arc melting electrodes formed from the base metal of the reactive or refractory metal or its alloy that is to be melted or welded and the element cerium. The volume percent of cerium to base metal plus cerium in the electrodes of this invention may be from 3 to 25 percent by volume (v/o), is usually from 5 to 15 v/o, and is preferably about 9.7 v/o. The nature of the combination of ingredients is not clearly understood. Regardless of the nature of the combination, however, the cerium in the electrode is fairly uniformly dispersed throughout the metal. The method of forming the electrode will be described later in this specification.

In accordance with the invention, the use of the non-consumable arc melting ceriated electrodes of this invention, formed from one of the reactive or refractory metals, and the above-described proportions of cerium, permits the safe non-consumable arc melting of the reactive and refractory metals and their alloys in a dynamic vacuum. Since melting with a non-consumable tungsten electrode cannot safely be accomplished at vacuum or greatly reduced pressures, the ability of the electrodes of this invention to sustain a high intensity melting arc in a dynamic vacuum is by itself a remarkable step forward in the art. In addition to the ability to sustain an arc in a vacuum, however, the electrodes of this invention also provide a powerful reducing and gettering agent in the form of cerium vapor or a cerium ion atmosphere in the vicinity of the arc just above the melt. Cerium has high negative free energies of formation with non-metallic impurity elements in the melt, and thus the cerium vapor reacts with impurities that are present as interstitials in the melt. The cerium compounds formed with these impurities are then withdrawn from the furnace by the dynamic vacuum.

In accordance with this invention, it is thus possible to achieve melts of the reactive and refractory metals and their alloys of unusually high purity through the removal of interstitial impurities during the course of the melting process itself. The electrodes of this invention are particularly effective in removing oxygen, carbon, and nitrogen as interstitial impurities in melts of the reactive and refractory metals and their alloys.

A novel method was developed for the fabrication of the cerium electrodes of this invention. Broadly described, this method comprises hydriding of chips of cerium, pulverizing the hydrided chips to powder in an inert atmosphere, mixing hydrided Ce powder with Cb powder, compacting, dehydriding by slow heating in a dynamic vacuum, followed by cold swaging of the sintered compact to produce the electrode. This method is the subject of the copending application of Simon S. Aconsky, one of the inventors of the subject matter of this application, and Robert W. Harrison, Serial No. 175,294, filed February 23, 1962.

For a clearer understanding of the invention, specific examples of the invention are given below. These examples are merely illustrative and are not to be understood as limiting the scope and underlying principles of the invention. In the preparation of a Cb—9.7 v/o Ce electrode the method was executed as follows:

Cerium chips were placed in a retort and evacuated to .05 micron. The chips were then heated to 600° F. and the retort was backfilled with purified hydrogen to a pressure of 3 p.s.i.g. When constant pressure was achieved, the furnace was shut off allowing the retort to come to room temperature. A constant pressure of 3 p.s.i.g. was maintained. The hydrogen was then drawn off and the furnace was backfilled with argon.

The hydrided cerium was pulverized to —325 mesh using a diamond mortar and blended with —325 mesh columbium powder in a Waring Blendor at 15,000 r.p.m. for 15 minutes. The blended powders were then pressed in a 1" diameter breakaway type die at 60 t.s.i. The compact was next inverted and repressed in the same manner. The grinding, blending, and compacting were all performed in the argon atmosphere to avoid atmospheric contamination.

The pressed compact was then inserted into a retort and evacuated to .05 micron. The temperature was raised slowly to 1600° F. with the pumps on to effectively dehydride the cerium. This procedure of dehydriding was adopted to circumvent the tendency of cerium to resinter.

Complete dehydriding was achieved at 1400° F. with negligible sintering, and this left sufficient porosity for the evolution of hydrogen gas. When the pressure returned to full vacuum (.05 micron) the temperature was slowly raised to 2950° F. and maintained for 1½ hours.

The theoretical density of the Cb—9.7 v/o Ce is 8.4 gm./cm.$^3$, and the sintered compact was calculated to be 88 percent of theoretical. The compact was then cold coined (repressed) at 75 t.s.i. which increased the density to 95 percent of theoretical. The compact was finally cold swaged at room temperature from 1 to ⅛ inch diameter by successive 20 mil reductions per pass.

In the preparation of the examples described below, all of the melting was performed in a specially designed arc-melting furnace. A water-cooled sightport, extending radially from the chamber, permitted direct visual and photographic observation of the arc. By means of recordings and visual observation the arc-melting process could be studied. The furnace was equipped with a 1250 ampere D.C. rectifier. A liquid air cold-trap and a 13 s.c.f.m. mechanical pump was provided for evacuation of the chamber. Power was supplied to the electrode through a water-cooled "stinger."

During normal operation the ceriated electrode was the "hot" or negative lead. The crucible which for most melting operations was a water-cooled copper hearth with a series of depressions on which pressed powder compacts were melted, was generally connected to positive and grounded. The melting chamber was completely water-cooled.

During a normal melting operation, powder compacts were placed into depressions in the water-cooled hearth or crucible. A central shallow depression was used for a titanium "getter-button." After the compacts were inserted and the furnace closed, the furnace was evacuated to a pressure less than 5 microns. The furnace chamber was then argon flushed and re-evacuated three times prior to melting.

Melting was initiated by physically "striking off" the ceriated electrode to the titanium "getter-button" and melting it for a period of about a minute. The melting of the "getter-button" was used to help react any residual oxygen or nitrogen which might be present. Once the "getter-button" was melted and the arc established, the vacuum valve was opened, and the arc was "walked" over to a compact. Melting then proceeded from compact to compact around the mold. When the operator was satisfied that he had achieved good penetration and mixing of the molten metal, the melting current was shut off. This melting process was repeated a total of four times. The pressure during melting under dynamic vacuum stabilized at about 200 microns indicating the presence of cerium vapor or a cerium ion atmosphere in the vicinity of the arc.

Although in the examples given the vacuum was stabilized at 200 microns, it should be understood that the process can be carried out at various conditions of dynamic vacuum. Generally, however, the arc-melting and arc-welding should take place at the lowest possible pressure to avoid contamination from the atmosphere and to promote purification. The pressure in the vicinity of the melt or weld will be dependent upon the pump capacity.

EXAMPLE I

A columbium powdered compact containing the following interstitials:

|  | P.p.m. |
|---|---|
| Carbon | 200 |
| Oxygen | 1600 |
| Nitrogen | 400 | was melted using a Cb—9.7 v/o Ce electrode in vacuum. The atmosphere during melting was a dynamic vacuum at a stabilized pressure of 200 microns. Chemical analysis results were as follows:

| Electrode | Atmosphere | Final (p.p.m.) | | | Hardness | | |
|---|---|---|---|---|---|---|---|
| | | C | O | N | Ra | Rb | BHN |
| Example I | Cb—9.7 v/o Ce | 200 (D.V.)[1] | 82 | 590 | 260 | 45 | 75 | 124 |

[1] D.V.=dynamic vacuum.

For purposes of comparison, a columbium compact with the same initial analysis of interstitial impurities was melted using a thoriated-tungsten electrode in argon. The results with the tungsten electrode were as follows:

| Electrode | Atmosphere | Final (p.p.m.) | | | Hardness | | |
|---|---|---|---|---|---|---|---|
| | | C | O | N | Ra | Rb | BHN |
| W—1 w/o ThO₂ | ⅓ atm. A | 105 | 1,100 | 400 | 63 | 100 | 232 |

It will be observed that the ceriated electrode and dynamic vacuum yielded considerably better results.

EXAMPLE II

To demonstrate the effect of pressure on the removal of oxygen present as oxides rather than interstitially, columbium powder compacts were prepared with the following composition:

|  | P.p.m. |
|---|---|
| Carbon | 1350 |
| Nitrogen | 400 |
| Oxygen | 400 |
| Oxygen as Cb₂O₅ | 3000 |

This compact was melted with a Cb—9.7 v/o Ce electrode in a ⅓ argon atmosphere with the following results:

| Electrode | Atmosphere | Final (p.p.m.) | | | Hardness | | |
|---|---|---|---|---|---|---|---|
| | | C | O | N | Ra | Rb | BHN |
| Cb-9.7 v/o Ce | ⅓ atm. A | 1,000 | 1,600 | 400 | 63 | 100 | 232 |

This same button was then remelted using a non-consumable Cb—9.7 v/o Ce electrode in a dynamic vacuum instead of the ⅓ argon atmosphere. Upon chemical analysis after melting the following results were obtained:

| Electrode | Atmosphere | Final (p.p.m.) | | | Hardness | | |
|---|---|---|---|---|---|---|---|
| | | C | O | N | Ra | Rb | BHN |
| Cb-9.7 v/o Ce | 200 (D.V.) | 170 | 200 | 300 | 38 | 56 | 100 |

In this remelt, using a dynamic vacuum, it is noted that both the interstitial impurities and the hardness of the columbium were markedly reduced.

Next, a series of binary columbium base alloys were non-consumably arc-melted to compare the effect of Cb—9.7 v/o Ce electrodes and tungsten electrodes on purification. The alloy additions were chosen to represent a range of values of the negative free energy of formation of oxides, carbides, and nitrides.

By melting the binaries with a Cb—9.7 v/o Ce electrode in vacuum, it was not only possible to purify the alloys by reaction of cerium with oxygen to form volatile cerium oxide, but it was also possible, by the vaporization of certain metal oxides that have higher vapor pressures than the molten metal, to remove these impurities also.

To provide a basis for comparison, a compact of each alloy was melted by each of the techniques listed below:

Technique 1: W—1 w/o ThO₂ electrode in ⅓ atm. argon
Technique 2: Cb—9.7 v/o Ce electrode in ⅓ atm. argon
Technique 3: Cb—9.7 v/o Ce electrode in dynamic vacuum The compacts were prepared from columbium powder with 1600 p.p.m. interstitial oxygen plus the metal alloy addition. After melting, each button was checked for hardness, analyzed for elements and interstitials, and examined metallographically. The relative ductility of each button was determined by a single forge impact at room temperature from a 500 lb. forging hammer. The results are given in Table I.

*Table I*

| Tech. | Alloy, w/o | Hardness | | | Chemical Analysis | | | | Forgeability (Percent Red. in Thickness) |
|---|---|---|---|---|---|---|---|---|---|
| | | Ra | Rb | BHN | Element, w/o | C, p.p.m. | O, p.p.m. | N, p.p.m. | |
| 1 | Cb-5Ti | 60 | 96 | 200 | 4.65 | 370 | 1,400 | 430 | 63.7 |
| 2 | Cb-5Ti | 58 | 94 | 193 | 4.78 | 380 | 1,500 | 410 | 43.5 |
| 3 | Cb-5Ti | 49 | 78 | 124 | 2.99 | 300 | 95 | 360 | 69.9 |
| 1 | Cb-5Zr | 49 | 80 | 159 | 5.75 | 300 | 1,200 | 360 | 43.4 |
| 2 | Cb-5Zr | 53 | 92 | 171 | 5.43 | 450 | 860 | 340 | 51.2 |
| 3 | Cb-5Zr | 50 | 85 | 121 | 5.17 | 290 | 670 | 320 | 65.0 |
| 1 | Cb-5Hf | 55 | 89 | 178 | 5.46 | 280 | 777 | 360 | 64.1 |
| 2 | Cb-5Hf | 53 | 88 | 165 | 4.67 | 280 | 760 | 400 | 62.4 |
| 3 | Cb-5Hf | 53 | 88 | 146 | 4.92 | 270 | 440 | 360 | 65.7 |
| 1 | Cb-5Mo | 60 | 96 | 200 | 5.45 | 320 | 920 | 400 | 52.1 |
| 2 | Cb-5Mo | 60 | 96 | 200 | 5.45 | 320 | 610 | 400 | 51.6 |
| 3 | Cb-5Mo | 54 | 90 | 158 | 5.41 | 165 | 235 | 300 | 57.2 |
| 1 | Cb-5V | 64 | 99 | 218 | 5.80 | 320 | 1,400 | 420 | 50.0 |
| 2 | Cb-5V | 62 | 100 | 218 | 5.71 | 310 | 1,350 | 420 | 52.4 |
| 3 | Cb-5V | 57 | 94 | 178 | 5.0 | 220 | 730 | 390 | 62.7 |

The data of Table I show that effective purification occured in all cases when melting was performed under vacuum with the Cb—9.7 v/o Ce electrode.

From the results of these binary alloy melts, it is evident that every one of the alloys vacuum melted with the Cb—9.7 v/o Ce electrode showed very substantial reductions in the over-all interstitial content and especially the oxygen level. As measured by the Brinell hardness the Cb—9.7 v/o Ce vacuum melted alloys were much softer than the alloys melted by the other two methods. Since most columbium alloys are susceptible to interstitial hardening, it is not surprising that the binary alloys melted with a Cb—9.7 v/o Ce electrode in vacuum (in addition to having the lowest interstitial content) were the most ductile as shown by the results of forging. In the Cb—5Zr alloy, the reduction in thickness was 43.4 percent with 1200 p.p.m. oxygen and 65 percent with 670 p.p.m. oxygen. In the Cb—5V alloy, a 37 percent reduction in the total interstitial level and a 48 percent reduction in the oxygen level increased the forgeability by 12.7 percent.

Of all the alloyed elements used in this test, the molybdenum (which, according to the best available data, has the smallest negative free energy of formation with respect to carbon, oxygen, and nitrogen of those elements tested) was reduced to the lowest interstitial level of each of the five alloys. When melted in argon with the Cb–9.7 v/o Ce electrode, a 34 percent reduction in the oxygen level was experienced, and when melted under vacuum with the Cb—9.7 v/o Ce electrode a 48 percent reduction in carbon, 75.5 percent reduction in oxygen and a 25 percent reduction in nitrogen resulted.

With the Cb—Ti alloy, the total reduction of the interstitial level included a lowering of the oxygen level from 1400 p.p.m. to 95 p.p.m.

WELDING

To evaluate the applicability of Cb—9.7 v/o Ce as a welding electrode material, the following test was performed:

Four welds were made in ⅛ inch thick Cb—1Zr sheet using the conventional Tungsten Insert Gas (TIG) shielded arc process. In this process either a stream of inert gas completely surrounds the arc and molten metal to shield against contamination by atmospheric gases, or the welding is accomplished with the electrode, arc, filler rod, and work enclosed in a weld-box filled with inert gas. When non-consumable electrodes of either the conventional tungsten type or the new electrodes of this invention are used, it is, of course, necessary to use a filler rod to provide the molten metal to effect the weld.

These four welds were made under the same conditions of weld-box atmosphere, amperage, technique, and weld filler rod. The only variance among the weld specimens was that each was welded using a different electrode material; namely, W—1 w/o $ThO_2$, W—2 w/o $ThO_2$, W—1 w/o $ZrO_2$, and Cb—9.7 v/o Ce. The tungsten electrodes represent commercially available types.

No electrode erosion problems were encountered during welding. Radiographic inspection showed no inclusions or voids. Tensile specimens were machined from the specimens transverse to the welds and the welds were examined metallographically and chemically analyzed for interstitials. Room temperature tensile data were obtained at strain rates of 0.0005 inch/inch/min. to yield and 120 lb./min. to failure. A summary of the weld specimen data is shown in Table II.

Table II

| Specimen | Electrode | Yield Stress 0.2% | U.T.S., p.s.i. | Percent Elongation, 2 inch gage length | Chem. Analysis (p.p.m.) | | |
|---|---|---|---|---|---|---|---|
| | | | | | C | O | N |
| WE-1 | Cb-9.7 v/o Ce | 24,660 | 43,005 | 14 | 68 | 180 | 110 |
| WE-2 | W-1 w/o $ThO_2$ | 29,070 | 43,300 | 14 | 56 | 235 | 125 |
| WE-3 | W-2 w/o $ThO_2$ | 27,560 | 43,255 | 12 | 115 | 460 | 120 |
| WE-4 | W-1 w/o $ZrO_2$ | 26,845 | 43,635 | 12 | 105 | 190 | 120 |

It is apparent from these data that the welds made from the Cb—9.7 v/o Ce electrode are either as good as or better than conventionally welded specimens with respect to purity. There are no significant strength differences.

The properties required for a suitable non-consumable arc-melting electrode are similar to those required for an arc-welding electrode. Just as tungsten with 1 weight percent $ThO_2$ is used for the arc-melting of reactive and refractory metals and their alloys, it is also used for the arc-welding of reactive and refractory metals and their alloys.

As stated previously, when using a tungsten electrode, tungsten may be washed into the molten pool through erosion of the tip or through splashing of lower melting metals from the molten pool onto the electrode forming a low melting tungsten alloy which drips back into the weld. A more serious source of contamination results when the electrode tip touches the molten weld causing the electrode to "stick." More often than not, in trying to free the electrode, the tip breaks off and remains in the weld causing a tungsten inclusion problem.

By using the ceriated electrodes of this invention to weld reactive and refractory metals and their alloys, all of the above-mentioned sources of weld contamination due to tungsten are eliminated, because the base metal of the weld and the electrode are the same. Even if sticking of the ceriated electrode should occur, only insignificant dilution of the base metal in the weld will result.

As shown in Table II, compared to welds made using W—1 w/o $ThO_2$, W—2 w/o $ThO_2$, and W—1 w/o $ZrO_2$ welding electrodes in argon, the weld made using the Cb—9.7 v/o Ce had the lowest interstitial level. Had the Cb—9.7 v/o Ce welding been done in a vacuum, even better purification would be expected.

In the area of welding both reactive and refractory metals, weld quality and purity are essential factors in the development of these materials as structural components. The high reactivity of these metals especially with interstitial elements that result in embrittlement of the welds demands that elaborate and expensive welding procedures be used to maintain even nominal purity of these welds. By using ceriated electrodes of the same base metal as the welds under vacuum conditions, the problem of metallic contamination can be eliminated, and at the same time, a powerful reducing agent will be supplied to the weld atmosphere; thus, the weld will be purified, and atmospheric contamination reduced simultaneously.

In addition to the non-consumable ceriated columbium electrodes described above, non-consumable electrodes of Mo—9.7 v/o Ce and W—9.7 v/o Ce were prepared. Non-consumable vacuum melts of molybdenum and tungsten were made with each of these electrodes without any apparent erosion. The condition of the electrodes after melting was very good. Rockwell and Brinell hardness data on molybdenum and tungsten buttons melted with these electrodes showed that a degree of purification occurred better than obtained by conventional, non-consumable arc-melting. A lowering of the interstitial level was evidenced by a reduction in the hardness values.

In accordance with this invention, ceriated electrodes are thus provided that achieve non-consumable arc-melting of the reactive and refractory metals and their alloys in a dynamic vacuum with simultaneous cerium gettering of interstitial impurities. The reaction products from the melt are removed by the dynamic vacuum and purity of the melt is achieved to a degree previously unattainable in non-consumable arc-melting. This invention thus achieves for non-consumable arc-melting advantages previously thought restricted to consumable arc-melting without sacrificing the recognized advantages of non-consumable arc-melting over consumable, and to all this adds the unique advantage of providing an inherent reducing and gettering agent of powerful proportions.

As used in the claims of this application, the term "metallic composition" includes both metallic elements and the metal-base alloys thereof.

The invention in its broader aspects is not limited to the specific details shown and described, but departures may be made from such details within the scope of the accompanying claims without departing from the principles of the invention and without sacrificing its chief advantages.

What is claimed is:

1. A non-consumable, arc-melting and arc-welding electrode for use in melting or welding reactive and refractory metallic compositions, the electrode being formed of a composition comprising from 3 to 25 volume percent cerium and the balance of the electrode composition being a metal selected from the group of reactive and refractory metals consisting of titanium, zirconium, and metals having a melting point of at least 1875° C., the metal selected being the same as the base of the metallic composition to be melted or welded.

2. A non-consumable, arc-melting and arc-welding electrode for use in melting or welding reactive and refractory metallic compositions, the electrode being formed of a composition comprising from 5 to 15 volume percent cerium and the balance of the electrode composition being a metal selected from the group of reactive and refractory metals consisting of titanium, zirconium, and metals having a melting point of at least 1875° C., the metal selected being the same as the base of the metallic composition to be melted or welded.

3. A non-consumable, arc-melting and arc-welding electrode for use in melting or welding reactive and refractory metallic compositions, the electrode being formed of a composition comprising about 9.7 volume percent cerium and the balance of the electrode composition being a metal selected from the gorup of reactive and refractory metals consisting of titanium, zirconium, and metals having a melting point of at least 1875° C., the metal selected being the same as the base of the metallic composition to be melted or welded.

4. A non-consumable, arc-melting and arc-welding electrode for use in melting or welding columbium and columbium-base alloys, the electrode being formed of a composition comprising about 9.7 volume percent cerium in columbium.

5. A non-consumable, arc-melting and arc-welding electrode for use in melting or welding molybdenum, the electrode being formed of a composition comprising about 9.7 volume percent cerium in molybdenum.

6. A non-consumable, arc-melting and arc-welding eletcrode for use in melting or welding tungsten, the electrode being formed of a composition comprising about 9.7 volume percent cerium in tungsten.

7. A non-consumable, arc-melting and arc-welding electrode for use in melting or welding reactive and refractory metallic compositions, the electrode being formed of a composition comprising from 3 to 25 volume percent cerium and the balance of the electrode composition being a metal selected from the group consisting of titanium, zirconium, chromium, vanadium, rhodium, hafnium, ruthenium, columbium, iridium, molybdenum, tantalum, osmium, rhenium and tungsten, and the metal selected being the same as the base of the metallic composition to be melted or welded.

8. A non-consumable, arc-melting and arc-welding electrode for use in melting or welding reactive and refractory metallic compositions, the electrode being formed of a composition comprising from 5 to 15 volume percent cerium and the balance of the electrode composition being a metal selected from the group consisting of titanium, zirconium, chromium, vanadium, rhodium, hafnium, ruthenium, columbium, iridium, molybdenum, tantalum, osmium, rhenium and tungsten, and the metal selected being the same as the base of the metallic composition to be melted or welded.

9. A non-consumable, arc-melting and arc-welding electrode for use in melting or welding reactive and refractory metallic compositions, the electrode being formed of a composition comprising about 9.7 volume percent cerium and the balance of the electrode composition being a metal selected from the group consisting of titanium, zirconium, chromium, vanadium, rhodium, hafnium, ruthenium, columbium, iridium, molybdenum, tantalum, osmium, rhenium and tungsten, and the metal selected being the same as the base of the metallic composition to be melted or welded.

10. A non-consumable electrode for use in arc-melting or arc-welding reactive and refractory metallic compositions, the electrode being formed of a composition comprising from 3 to 25 volume percent cerium and the balance of the electrode composition consisting essentially of a metal selected from the group of reactive and refractory metals consisting of titanium, zirconium, and metals having a melting point of at least 1875° C.

11. In a process for arc-melting metallic compositions selected from the group of reactive and refractory metals consisting of titanium, zirconium and metals having a melting point of at least 1875° C., in which a non-consumable electrode is placed adjacent the metallic composition to be melted and in which an electric current is passed through the electrode and the metallic composition to establish an electric arc between them, the improvement that comprises the steps of: employing an electrode comprising from 3 to 25 volume percent cerium with the balance of the electrode consisting essentially of a metal that is the same as the base of the metallic composition, establishing a dynamic vacuum of about 200 microns around the electrode and metallic composition, and maintaining such dynamic vacuum during arc-melting.

References Cited in the file of this patent

UNITED STATES PATENTS

| 1,847,617 | Lowenstein et al. | Mar. 1, 1932 |
| 2,810,640 | Bolkcom et al. | Oct. 22, 1959 |
| 2,933,594 | Johnson et al. | Apr. 19, 1960 |

FOREIGN PATENTS

| 40,774 | Norway | Jan. 5, 1925 |